US010900828B2

(12) United States Patent
Meister et al.

(10) Patent No.: US 10,900,828 B2
(45) Date of Patent: Jan. 26, 2021

(54) LABORATORY BALANCE WITH A CANTILEVERED WEIGHING PAN

(71) Applicant: Mettler-Toledo GmbH, Greifensee (CH)

(72) Inventors: Beat Meister, Naenikon (CH); Alice Buchmann, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 181 days.

(21) Appl. No.: 16/381,150

(22) Filed: Apr. 11, 2019

(65) Prior Publication Data

US 2019/0316953 A1    Oct. 17, 2019

(30) Foreign Application Priority Data

Apr. 17, 2018   (EP) ..................................... 18167733

(51) Int. Cl.
   *G01G 21/22*      (2006.01)
   *G01G 21/23*      (2006.01)
   *G01G 21/28*      (2006.01)
(52) U.S. Cl.
   CPC .............. *G01G 21/22* (2013.01); *G01G 21/23* (2013.01); *G01G 21/286* (2013.01)
(58) Field of Classification Search
   CPC ....... G01G 21/22; G01G 21/23; G01G 21/286
   See application file for complete search history.

(56) References Cited

U.S. PATENT DOCUMENTS

| 6,557,391 | B2 | 5/2003 | Lüchinger |
| 6,603,081 | B2 | 8/2003 | Lüchinger |
| 6,835,901 | B2 | 12/2004 | Lüchinger |
| 7,012,198 | B2 | 3/2006 | Lüdi et al. |
| 7,227,087 | B2 * | 6/2007 | Luechinger ............ G01G 21/22 |
| | | | 177/180 |
| 7,227,088 | B2 | 6/2007 | Luechinger et al. |
| 8,178,799 | B2 | 5/2012 | Lüchinger |

FOREIGN PATENT DOCUMENTS

DE        2065122 A1    6/1972

* cited by examiner

*Primary Examiner* — Randy W Gibson
(74) *Attorney, Agent, or Firm* — Standley Law Group LLP; Jeffrey S. Standley; Stephen L. Grant

(57) ABSTRACT

A laboratory balance (1) has a weighing pan (14) in a weighing chamber (10). A rear wall (4) separates the weighing chamber separates from a housing (11) that contains a weighing cell (12) with a load-receiving structure (13). A suspension pin (27) extends in a transverse direction of the load-receiving structure. The weighing pan is engaged with the load-receiving structure through at least one passage opening (31) in the rear wall. Two spaced-apart sidebars (29) of the weighing pan are held together by a connecting member (30). Each sidebar has an L-shaped configuration with a horizontal foot portion (55) and a vertical leg portion (56). A hook-shaped portion (64) of the vertical leg is seated on the suspension pin, through sliding contact between the suspension pin and a guiding portion (65) that extends from the hook-shaped portion away from the horizontal foot portion, sloping upwardly.

14 Claims, 9 Drawing Sheets

LABORATORY BALANCE WITH A CANTILEVERED WEIGHING PAN

CROSS-REFERENCE TO RELATED APPLICATIONS

This application makes a claim of priority to European Patent Application No. 18167733.7, filed on 17 Apr. 2018, which is incorporated by reference as if fully recited herein.

TECHNICAL FIELD

The claimed invention relates to a laboratory balance wherein the weighing pan is supported by a cantilever arm, which protrudes in a substantially horizontal direction from a housing containing a weighing cell into a weighing chamber, i.e. an enclosed compartment adjoining the housing and containing the weighing pan. By way of a passage opening in the housing, the cantilevered support arm, which is connected to a load-receiving part of the weighing cell, reaches into the weighing chamber, so that the weight force exerted by an object on the weighing pan is transmitted from the weighing pan to the weighing cell by way of the cantilever arm and the load-receiving part. The weight force is measured by the weighing cell using a known electro-mechanical principle, and the measurement result is made available numerically for display and/or further processing.

BACKGROUND ART

The concept of a cantilever-supported weighing pan or weighing platform in a laboratory balance belongs to the known state of the art. This configuration is used for balances of the highest precision class that are typically used in chemical and pharmaceutical laboratories, industrial quality control, the jewelry trade, numismatics, weighing of air-pollution filters, and many other applications. The sensitivity which enables a balance to measure weight very precisely also makes the balance susceptible to any air circulation in the area of the weighing pan. This susceptibility to air drafts is the reason for the aforementioned enclosed weighing chamber, also referred to as a draft shield.

A laboratory balance with a cantilevered weighing pan is described for example in U.S. 2003/0188897. In its operating position, this type of balance presents itself with the draft-shield-enclosed weighing chamber located in front, i.e. closest to the user, while the housing with the weighing cell is located in back, i.e. on the far side from the user. The cantilevered support arm is L-shaped, with the vertical leg of the L connected to the load-receiving part on the front side of the weighing cell and the horizontal leg with the weighing pan protruding forward from the weighing cell into the weighing chamber. The connection between the cantilevered support arm and the load-receiving part of the weighing cell is designed to solidly transmit the vertically directed weight force, but to yield to transverse, horizontally directed forces by slipping out of full engagement.

A balance with a cantilever-supported weighing pan according to U.S. 2003/0188897 needs no passage opening through the floor of the weighing chamber. This makes the weighing chamber easy to clean and eliminates the problem of spilled material dropping through the floor opening into a base compartment below the weighing chamber. This is particularly important, if the balance has a built-in calibration mechanism installed in the base enclosure below the weighing chamber.

In U.S. Pat. No. 6,557,391, a laboratory balance analogous to the preceding example is described, wherein the cantilevered weighing pan is interchangeable against different kinds of holder devices for the weighing load, for example a device that can hold a test tube in an inclined position.

In a laboratory balance described in U.S. Pat. No. 7,227,088, a cantilevered carrier arm is designed to hold a flask at an adjustable angle with the mouth of the flask positioned close to a small opening in a sidewall panel of the draft shield through which substances can be dispensed into the flask, e.g. from a pipette. The connection of the cantilevered carrier arm to the load-receiving part of the weighing cell is analogous to the preceding example, so that different weighing load carriers can be used interchangeably on the same balance.

The versatility of the concept of a cantilevered carrier arm is further demonstrated in U.S. 2010/0170723 A1, wherein a carousel mechanism for multiple receiving vessels is mounted on the cantilevered carrier arm, and a dosage-dispensing device is arranged to dispense prescribed amounts of substance into the receiving vessels in an automated process in which the balance, the carousel mechanism and the dosage-dispensing device are interfaced to a computer or processor controlling the flow of operations according to a software program.

In all of the foregoing examples, the weighing object carrier (herein generally referred to as weighing pan) is configured as a substantially L-shaped structure, wherein the vertical leg of the L is releasably connected to the load-receiving part of the weighing cell, and the foot of the L forms the cantilevered support arm that projects into the weighing chamber and carries a weighing platform or other load-supporting element. While the operation of connecting and releasing the weighing pan in the prior-art balances cited above does not require the use of tools, it cannot be performed in a casual manner, as it takes a certain degree of diligence to ensure the correct engagement between the weighing pan and the load-receiving part of the weighing cell.

The object of the present invention is to improve a laboratory balance of the type described above by providing one or more new features that facilitate the operations of engaging and releasing the connection between the weighing pan and the load-receiving part of the weighing cell.

SUMMARY

This task is solved by a laboratory balance with a weighing pan according to the independent claim. Advantageous embodiments and detail features of the invention are set forth in the dependent claims.

A laboratory balance of the type to which this invention relates includes a weighing chamber containing a weighing pan and a housing containing a weighing cell. The weighing chamber has a weighing chamber rear wall that is part of the housing. The direction from the weighing chamber to the housing is defined as the longitudinal or front-rear direction of the laboratory balance. A transverse direction is defined horizontal and perpendicular to the longitudinal direction. The weighing cell includes a load-receiving structure which is arranged on the front side of the weighing cell and in close proximity to the weighing chamber rear wall. The load-receiving structure includes a suspension pin extending in the transverse direction of the load-receiving structure. The weighing pan is movable in the longitudinal direction towards and away from the weighing chamber rear wall, and the weighing chamber rear wall has at least one passage opening through which the weighing pan can be brought into engagement with the load-receiving structure. The weighing pan includes two sidebars spaced apart and held together by a connecting member, each sidebar having a substantially horizontal leg and a substantially vertical leg joined in the shape of the letter L, wherein the vertical leg includes a longitudinal rearward-directed extremity with a hook-shaped portion configured to engage the suspension pin of the load-receiving structure. According to the invention, the longitudinal rearward-directed extremity of the vertical leg of each of the two sidebars further includes a downward-facing guiding portion located to the rear of the hook-shaped portion and sloping upwards from the hook-shaped portion whereby, through sliding contact between the guiding portion and the suspension pin, the hook-shaped portion is guidable to seat itself in an engaged position on the suspension pin.

In preferred embodiments of the laboratory balance according to the invention, the load-receiving structure includes at least one seating element arranged at a location below the suspension pin, while the vertical leg of each of the two sidebars of the weighing pan includes a longitudinal rearward-directed support portion arranged at a location below said longitudinal rearward-directed extremity. The support portion is configured to seat itself on the seating element so that the engagement contact between the support portion and the seating element forms a lever fulcrum for the static moment of the weight of the weighing pan to pull the hook-shaped portion into secure engagement with the suspension pin.

In preferred embodiments of the laboratory balance according to the invention, the suspension pin and the seating element are spaced apart from each other and arranged to extend in a transverse direction of the load-receiving structure and furthermore, the suspension pin and the seating element are of rectangular, circular, oval, or polygonal cross section.

Preferably, the spacing between the hook-shaped portion and the supporting portion is substantially equal to the spacing between the suspension pin and the seating element. This arrangement ensures alignment between the weighing pan and the load receiving structure when the weighing pan is installed on the load-receiving part of the weighing cell.

The hook-shaped portion of the weighing pan preferably has an arcuate contour shape designed for engagement with the suspension pin. The arcuate contour shape of the hook-shaped portion perfectly mates with the cross section of the suspension pin.

In preferred embodiments of the laboratory balance according to the invention, the connecting member of the weighing pan is configured as a cross bar connecting the vertical legs of the two sidebars. Besides serving the connecting function, the cross bar also limits the extent of inward movement of the weighing pan in the longitudinal direction. Another advantage of the cross bar is that the weighted item, e.g. a vial, is not in physical contact with the weighing chamber rear wall. As the weighted item is only in contact the weighing pan, correct weight measurement is ensured.

In addition, or as an alternative, to connecting the vertical legs of the two sidebars, the connecting member of the weighing pan may include a grid-shaped platform connecting the horizontal foot portions of the two L-shaped sidebars. The grid-shaped platform acts as a primary load receiving portion of the weighing pan.

In an advantageous configuration of the weighing pan, a sample receiver in the form of a plate is arranged and firmly attached on top of the grid-shaped platform. The sample receiver serves as a visual guide for centering the weighing load on the weighing pan in order to minimize weighing errors due to off-center weighing loads. It also provides a secure support surface for small or irregularly shaped weighing objects that could not be safely seated on the grid.

Advantageously, the passage opening in the weighing chamber rear wall is configured in the form of two vertical slits whose widths, heights and distance from each other conform to the vertical portions of the two sidebars with sufficient clearance to allow the sidebars to pass through the slits.

In preferred embodiments of the invention, the spacing between the two vertical slits of the weighing chamber rear wall is substantially equal to the spacing between the two entire sidebars of the weighing pan. In other words, the two sidebars are parallel to each other. Thus, the two vertical slits effortlessly guide the two sidebars during the operation of installing the weighing pan on the load-receiving part of the weighing cell.

Advantageously, the suspension pin is longer than the spacing between the two sidebars of the weighing pan. This arrangement prevents any unwanted disengagement between the weighing pan and the load-receiving part due to a possible displacement of the weighing pan in a transverse direction.

With a laboratory balance according to the invention, the operation of installing the weighing pan on the load-receiving part of the weighing cell is accomplished by the following sequence of steps:

positioning the weighing pan on the weighing chamber floor with the vertical legs of the two L-shaped sidebars next to, and facing towards, the two vertical slits of the weighing chamber rear wall;

advancing the vertical legs of the two sidebars into the two corresponding vertical slits of the weighing chamber rear wall;

pushing the weighing pan in the direction towards the weighing chamber rear wall with a force sufficiently strong to cause the slanted guiding portions on the vertical legs of the two sidebars to slide up on the suspension pin of the load-receiving structure; and continuing to push the weighing pan in the direction towards the weighing chamber rear wall until the hook-shaped portions settle into engagement with the suspension pin and the support portions of the vertical legs of the L-shaped side bars are in solid contact with the seating elements, at which point the weighing pan has reached its operating position.

The movement of the weighing pan in the last step can be advantageously limited, if the cross bar which connects the vertical legs of the two sidebars, is arranged to stop the further advancement of the weighing pan before the horizontal foot portions of the L-shaped side bars begin to enter the vertical slits.

Further in accordance with the invention, the operation of uninstalling the weighing pan is accomplished by the following sequence of steps:

lifting the weighing pan in a substantially vertical upward direction with a sufficiently strong force to disengage the hook-shaped portions of the weighing pan from the suspension pin; and allowing the guiding portions to freely slide back over the suspension pin under the force of gravity to the point where the weighing pan is free of the suspension pin and can be taken out of the weighing chamber.

BRIEF DESCRIPTION OF THE DRAWINGS

A laboratory balance with the inventive arrangement of the weighing pan and its attachment to the load-receiving part of the load cell will be described hereinafter through embodiments shown schematically in the drawings, wherein identical reference number are used to identify identical parts and wherein.

DETAILED DESCRIPTION

Figure 1:
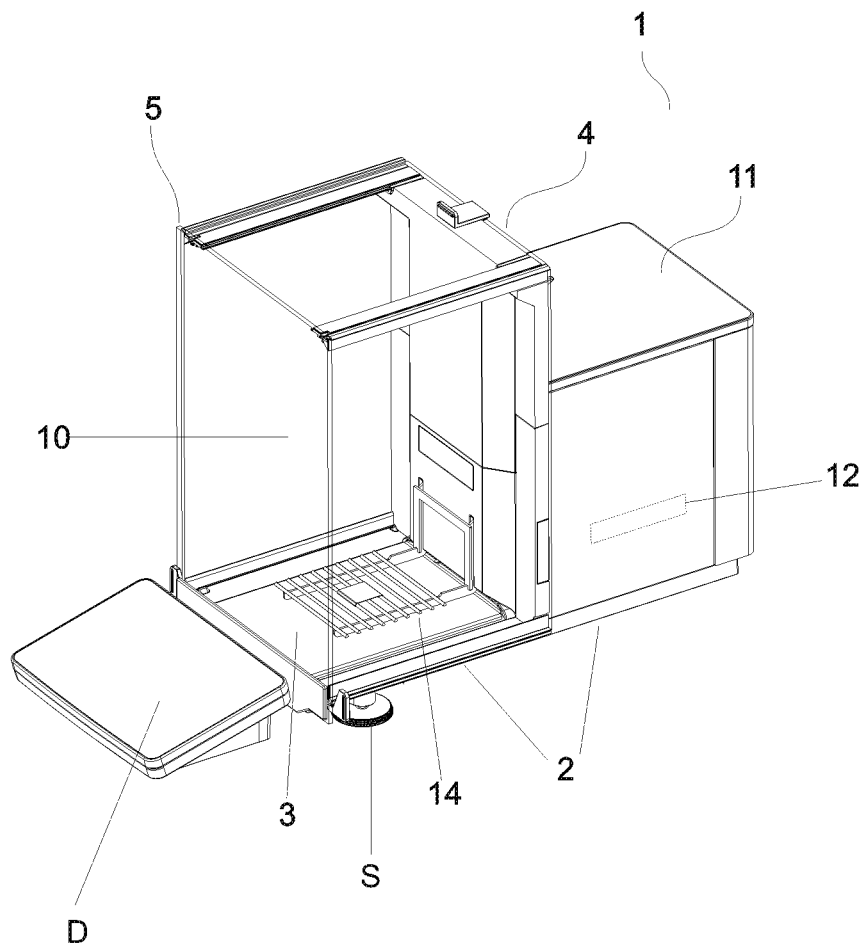
FIG. 1 represents a complete laboratory balance of the type to which the invention relates, in a perspective view.

FIG. 1 illustrates a laboratory balance 1 according to the invention in a three-dimensional view. The principal parts of the laboratory balance 1 are the display console D, the base body 2, the weighing chamber 10, and the housing 11 which contains the weighing cell 12. The weighing pan 14, shown here in the form of a grate-shaped weighing platform 14, is enclosed inside the weighing chamber 10. The weighing chamber 10 is delimited against the ambient space by transparent wall panels of a draft shield 5, against the housing by the weighing chamber rear wall 4, and against the base body 2 by the weighing chamber floor 3. One of the support feet S of the balance 1 is shown at the corner of the base body 2 that faces the viewer.

Figure 2:
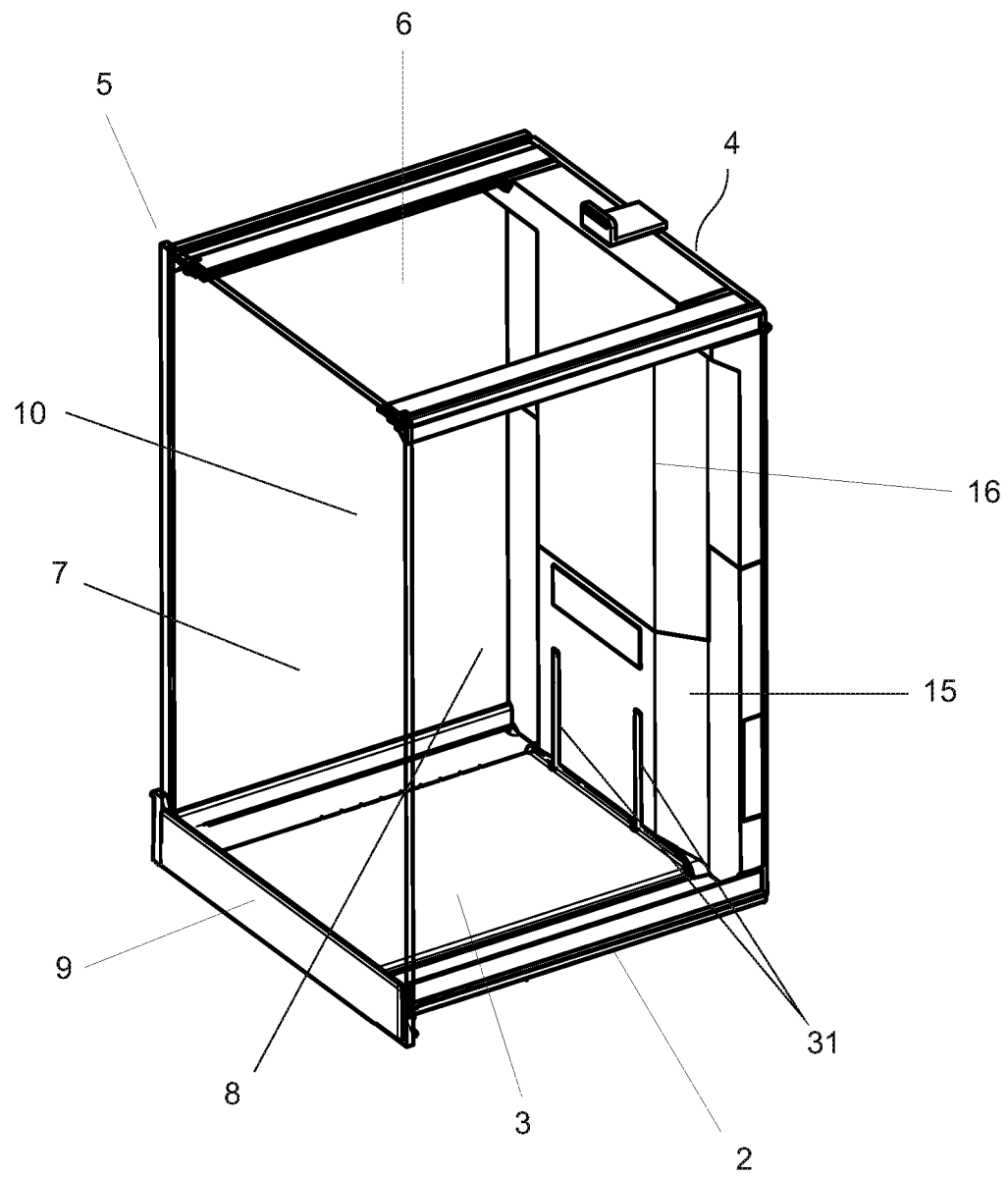
FIG. 2 represents the draft shield of the laboratory balance of FIG. 1, in a perspective view.

FIG. 2 shows the weighing chamber 10 by itself, without the rest of the balance 1. The weighing chamber 10 is enclosed at the top, sides and front by the draft shield wall panels 6, 7, 8 and 9, respectively; at the backside by the weighing chamber rear wall 4, and at the bottom by the weighing chamber floor 3. The weighing chamber rear wall 4 is of modular construction, with a base module 15 and a top module 16. The base module 15 of the weighing chamber rear wall 4 has two passage openings in the form of vertical slits 31 through which the weighing pan 14 is connected to the weighing cell 12 as described and illustrated hereinafter in detail.

Figure 3A:
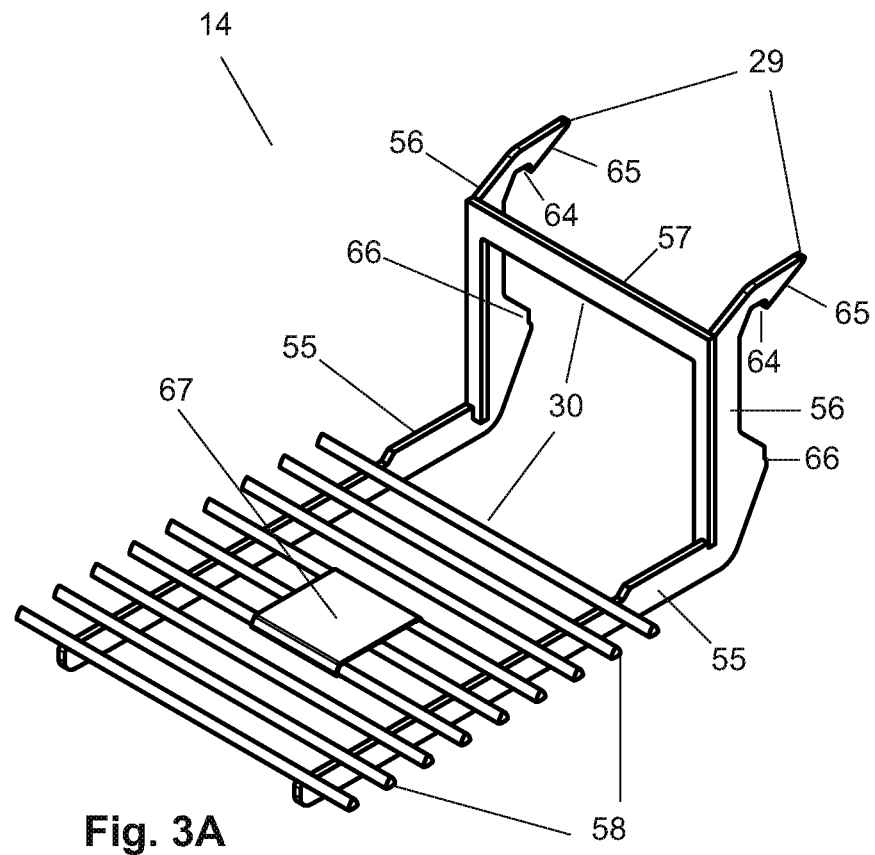
FIG. 3A represents the weighing pan of the balance according to the invention, in a perspective view.
Figure 3B:
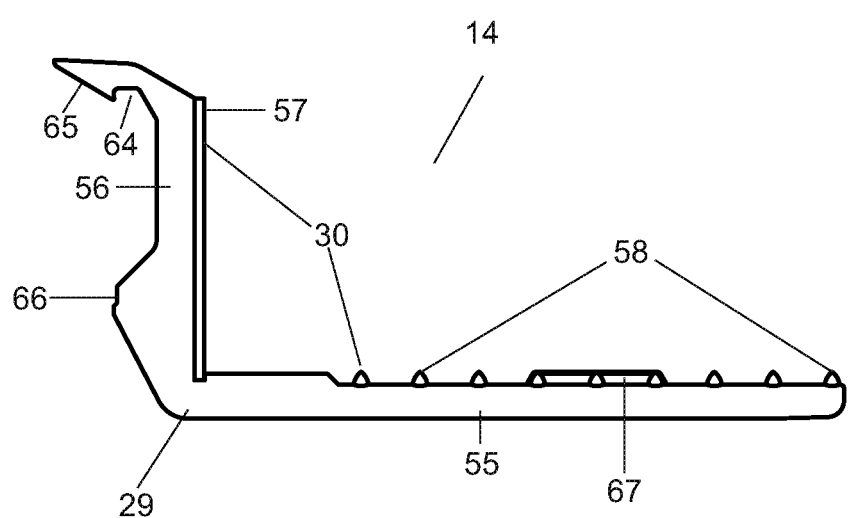
FIG. 3B represents a side view of the weighing pan of FIG. 3A.

FIG. 3A shows the weighing pan 14 of the balance 1 in a perspective view and FIG. 3B shows the same in a side view. The principal members of the weighing pan 14 are two L-shaped side bars 29 extending in the longitudinal or front-rear direction and in the vertical direction (relative to the installed position of the weighing pan 14 in the balance 1), and the cross bar 57 as well as the bars of the grid 58 extending in the transverse direction. The cross bar 57 which connects the vertical portions or legs 56 of the L-shaped side bars 29 and the grid 58 which connects the horizontal portions or cantilevered foot portions 55 of the L-shaped side bars 29 are collectively referred to herein as connecting members 30. Specific features of the vertical portions 56 which are relevant to the invention and whose function will become apparent from the description and illustrations of FIGS. 4 to 6 include the hook-shaped portions 64, the sloped guiding portions 65, and the supporting portions 66. A sample receiver 67 in the form of a plate is arranged and firmly attached on top of the grid 58. The sample receiver 67 serves as a visual guide for centering the weighing load on the weighing pan 14 in order to minimize weighing errors due to off-center weighing loads. It also provides a secure support surface for small or irregularly shaped weighing objects that could not be safely seated on the grid 58.

Figure 4A:
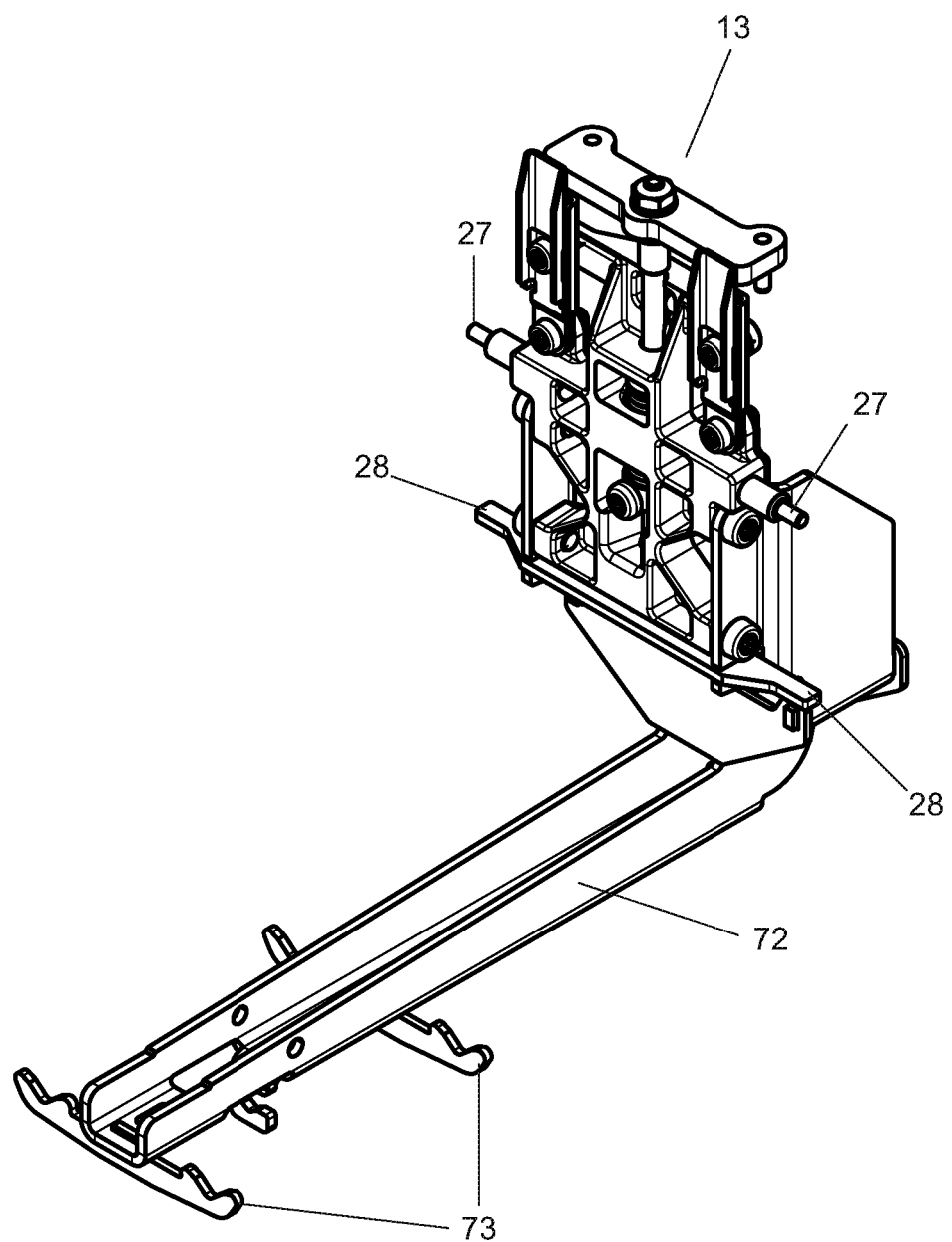
FIG. 4A represents the load-receiving structure of the weighing cell of the balance according to the invention, in a perspective view.
Figure 4B:
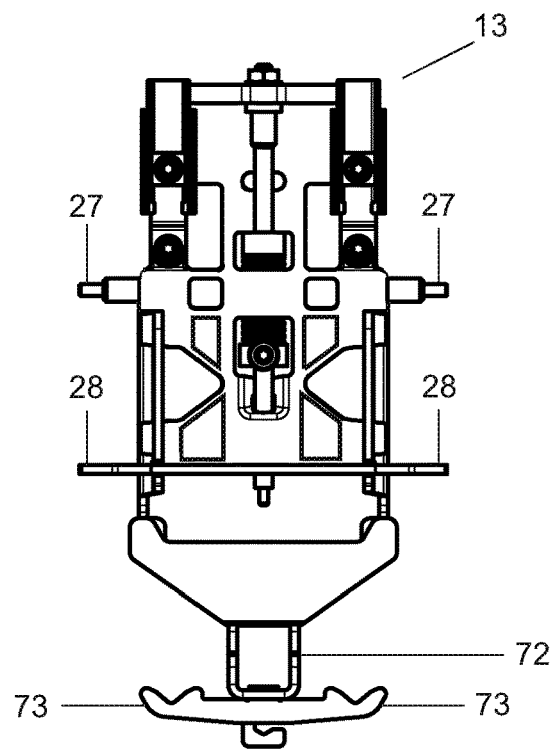
FIG. 4B represents a frontal view of the load-receiving structure of FIG. 4A.
Figure 4C:
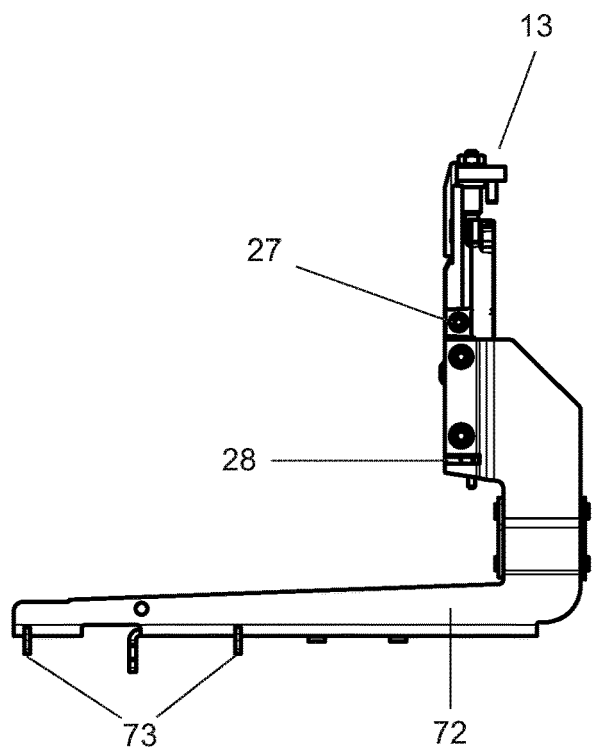
FIG. 4C represents a side view the load-receiving structure of FIG. 4A.

FIGS. 4A to 4C show, respectively, a perspective view, a frontal view and a side view of the load-receiving part or load-receiving structure 13 which is part of the weighing cell 12 of the laboratory balance 1. Specific features of the load-receiving structure 13 which are relevant to the invention include the suspension pin 27 and the seating element 28. When the weighing pan 14 is installed on the load-receiving structure 13 (see FIGS. 5A to 5C), the hook-shaped portions 64 on the vertical legs 56 of the L-shaped side bars 29 engage the stepped-off terminal portions at both ends of the suspension pin 27, while the support portions 66 on the vertical legs 56 of the L-shaped side bars 29 are seated on the lateral extremities of the seating element 28. The illustrated load-receiving structure 13 includes at its lower end a cantilevered support arm 72 with transverse calibration weight cradles 73. The support arm 72 and calibration weight cradles 73 are part of a calibration mechanism that is enclosed in the base body 2 below the weighing chamber floor 3 of the laboratory balance 1. However, the support arm 72 and the calibration weight cradles 73 are not relevant to the invention and should in no way be seen as limitations of the invention.

Figure 5A:
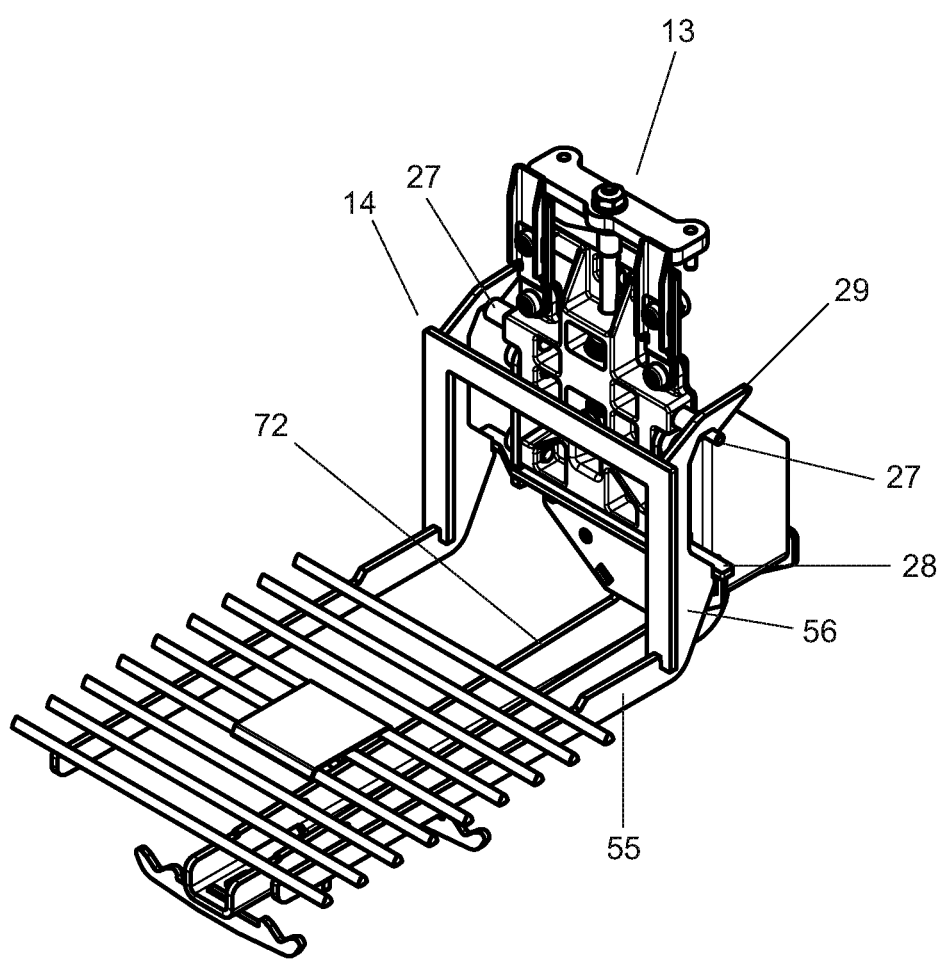
FIG. 5A shows the weighing pan of FIGS. 3A to 3B installed on the load-receiving structure of FIGS. 4A to 4C.
Figure 5B:
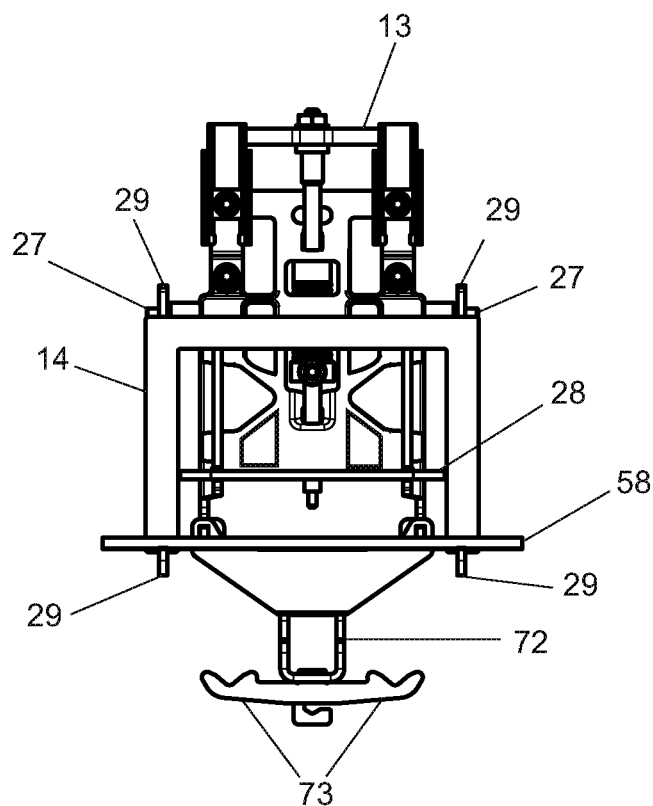
FIG. 5B shows the weighing pan and load-receiving structure of FIGS. 5A to 5C in a frontal view.
Figure 5C:
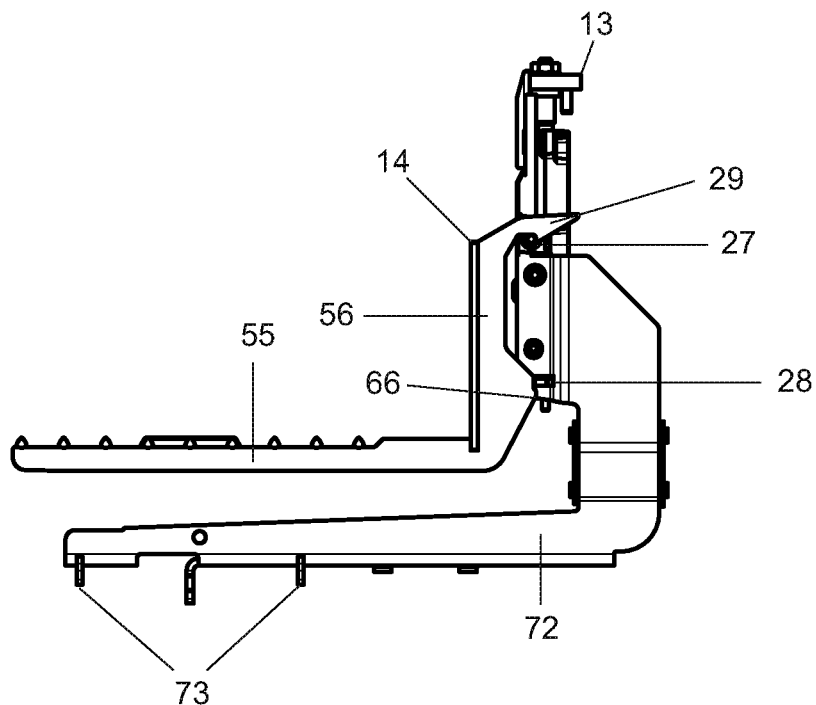
FIG. 5C shows the weighing pan and load-receiving structure of FIGS. 5A to 5C in a side view.

FIGS. 5A to 5C show, respectively, a perspective view, a frontal view and a side view of the weighing pan 14 of FIGS. 3A and 3B together with the load-receiving structure 13 of FIGS. 4A to 4C to illustrate how they are connected to each other. When installed inside the balance, the horizontal portions 55 of the L-shaped side bars 29 with the grid platform 58 extend into the weighing chamber 10 at a vertical distance above the weighing chamber floor 3, while the support arm 72 with the calibration weight cradles 73 is located inside the base body 2 below the weighing chamber floor 3. Analogously, the forward-facing portion of the vertical leg 56 of the weighing pan 14 is located at a clear distance in front of the weighing chamber rear wall 4, while the load-receiving structure 13 is located at a clear distance behind the weighing chamber rear wall 4. The folded-back, longitudinally directed portions of the side bars 29 extend with all-around lateral clearance through the vertical slits 31 of the weighing chamber rear wall 4 for the engagement with the suspension pin 27 and the seating element 28 of the load-receiving structure 13.

Figure 6A:
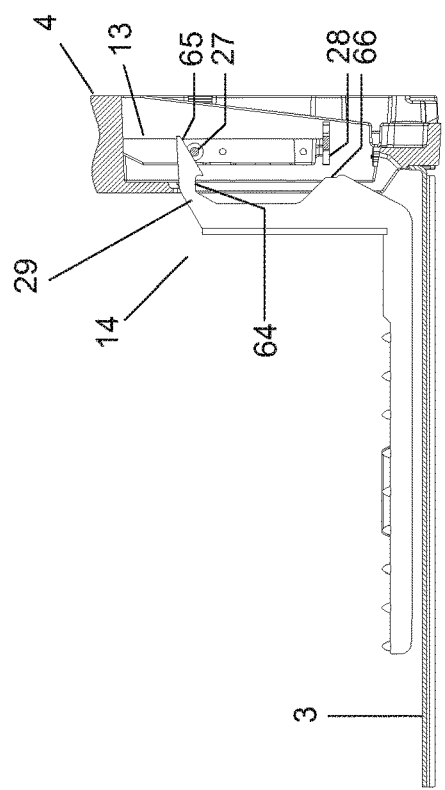
FIGS. 6A to 6D illustrate the sequence of steps for attaching the weighing pan to the load-receiving structure of the weighing cell.
Figure 6B:
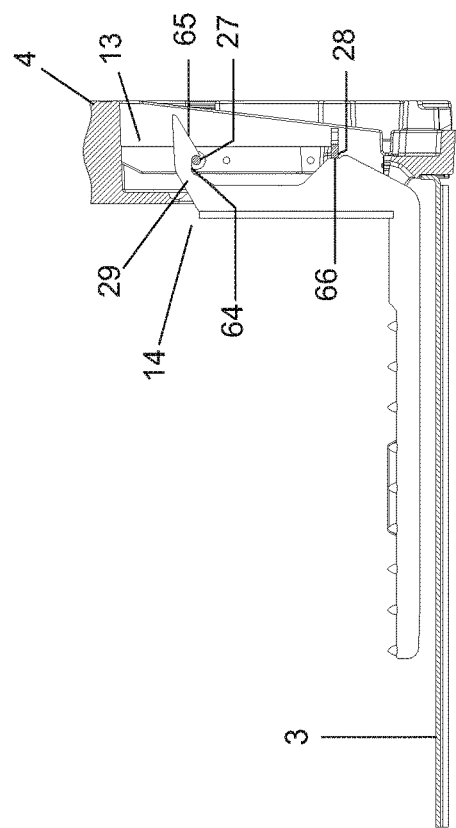
Figure 6C:
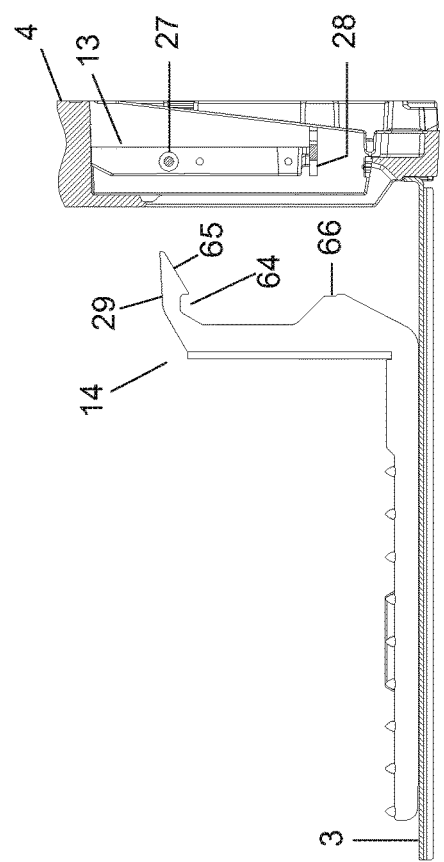
Figure 6D:
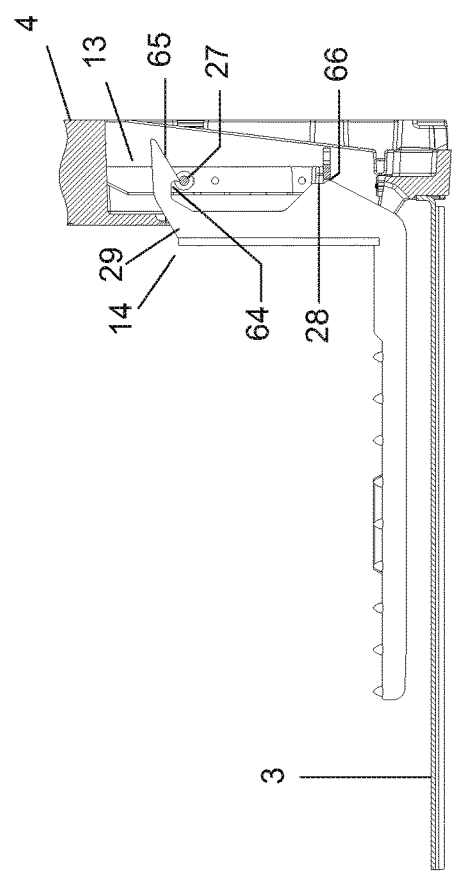

FIGS. 6A to 6D illustrate the sequence of motions for attaching the weighing pan to the load-receiving part of the weighing cell. In FIG. 6A, the weighing pan 14 is placed on the weighing pan floor 3 in front of the weighing chamber rear wall 4, with the folded-back, longitudinally directed portions of the side bars 29 lined up for entry into the vertical slits 31 of the weighing chamber rear wall 4. In FIG. 6B, the weighing pan has been pushed in the direction towards the weighing chamber rear wall 4 to the point where the sloped guiding portions 65 of the folded-back, longitudinally directed portions of the side bars 29 have passed through the vertical slits 31 and begin to glide up on the suspension pins 27. In FIG. 6C, the weighing pan has been pushed further back to the highest point of the engagement movement, where the sloped guiding portions 65 meet the hook-shaped portions (64). In FIG. 6D, the weighing pan 14 has been pushed beyond the limit of the sloped guiding portions 65 and, under the influence of gravity, has settled into an engagement where the hook-shaped portion 64 embraces the suspension pin 27. At the same time, the support portions 66 have settled solidly into the seating element 28. The engagement contacts between the support portions 66 and the seating element 28 forms a lever fulcrum for the static moment of the weight of the weighing pan 14 to pull the hook-shaped portion 64 into secure engagement with the suspension pin 27.

Figure 7B:
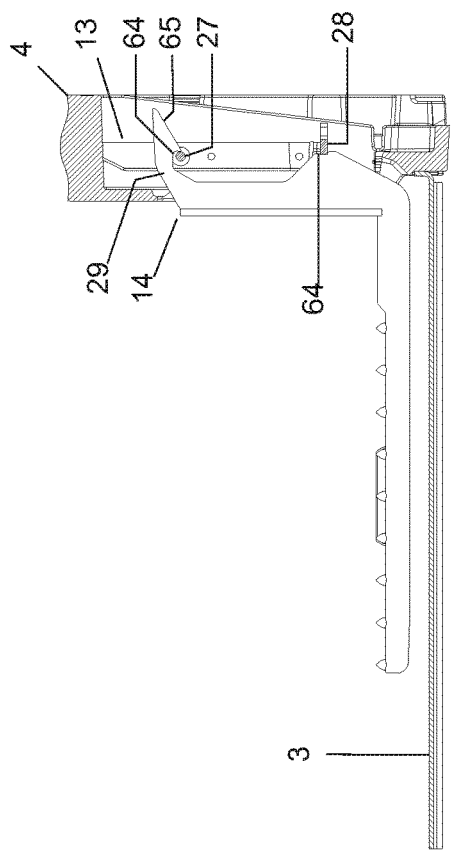
FIGS. 7A to 7D illustrate the sequence of steps for taking the weighing pan off the load-receiving structure of the weighing cell.
Figure 7D:
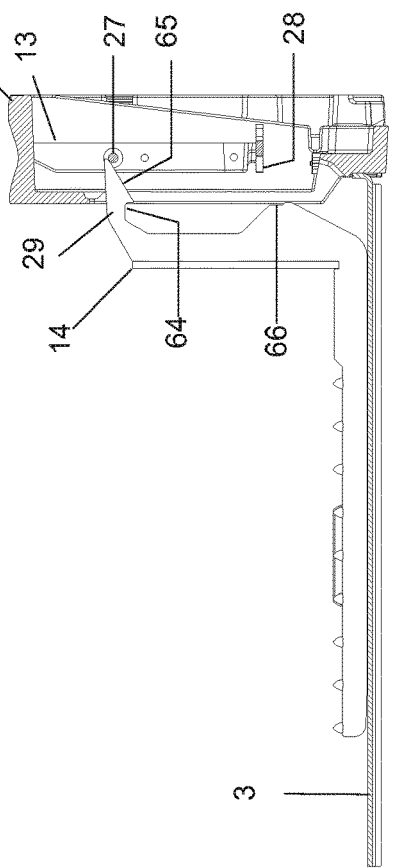
Figure 7A:
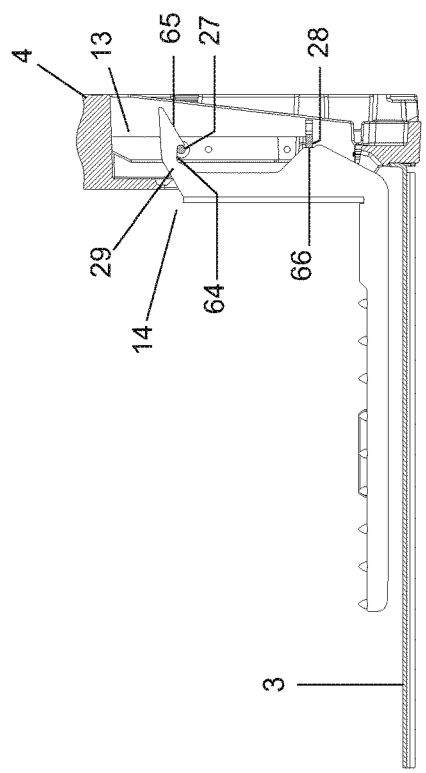
Figure 7C:
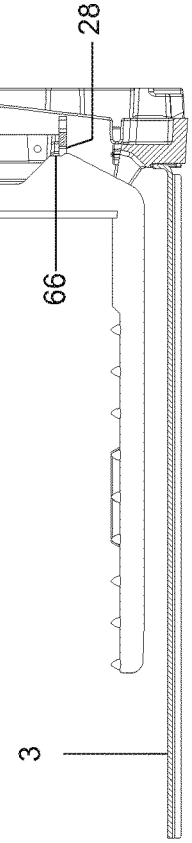

FIGS. 7A to 7D illustrate the sequence of motions for detaching the weighing pan from the load-receiving part of the weighing cell. In FIG. 7A, the weighing pan 14 is attached to the load-receiving structure 13. In FIG. 7B, the weighing pan 14 is beginning to be lifted out of its seat on the load-receiving structure 13. The hook-shaped portions 64 are no longer seated in solid contact on the suspension pin 27. In Figure C, the weighing pan 14 has reached the highest point of the disengagement movement where the hook-shaped portions 64 have slipped off the suspension pin 27 and the sloped guiding portions 65 are beginning to glide down on the suspension pin 27. In FIG. 7D, the guiding portions 65 have slid back along the suspension pin 27 under the force of gravity to the point where the weighing pan 14 is resting on the weighing chamber floor 3, freed from the suspension pin 27 and the seating element 28, and can be taken out of the weighing chamber 10.

Although the invention has been described through the presentation of one specific embodiment of the inventive concept of attaching a cantilevered weighing pan to a load-receiving structure of a weighing cell, it is considered self-evident that numerous additional variants are encompassed by the teachings of the present invention, including for example any other kind of cantilevered weighing object holder besides a grid-shaped platform. Such combinations and variations of the inventive arrangement of a cantilevered weighing object carrier connected to a load-receiving structure of a weighing cell are considered without exception to fall within the scope of protection that is hereby sought for the present invention.

What is claimed is:

1. A laboratory balance, comprising:
   a weighing chamber, with a weighing chamber rear wall with at least one passage opening therethrough;
   a weighing pan, located inside the weighing chamber; comprising two sidebars spaced apart and held together by a connecting member, each of the sidebars having a substantially L-shaped configuration with a substantially horizontal portion and a substantially vertical portion that are joined together at a substantially right angle, the vertical portion further comprising a hook-shaped portion;
   a housing, adjoining the weighing chamber rear wall; and
   a weighing cell, located inside the housing, the weighing cell comprising a load-receiving structure, arranged on a side of the weighing cell that faces the weighing chamber rear wall, the load-receiving structure comprising a suspension pin that extending in a direction transverse of the load-receiving structure), such that the weighing pan moves in a longitudinal direction of the laboratory balance towards and away from the weighing chamber rear wall, the weighing pan being brought into engagement with the load-receiving structure through the at least one passage opening;
   wherein the hook-shaped portion is configured to engage the suspension pin and the vertical portion of each sidebars further comprises a guiding portion that extends from the hook-shaped portion towards the load-receiving structure and slopes upwards from the hook-shaped portion, so that, through sliding contact between the suspension pin and the guiding portion, the hook-shaped portion is guided to seated engagement on the suspension pin.

2. The laboratory balance of claim 1, further comprising:
   a seating element on the load-receiving structure; and
   a longitudinally-extending support portion on the vertical portion of each sidebar, configured to engage with the seating element to firmly secure the engagement of the hook-shaped portion to the suspension pin.

3. The laboratory balance of claim 2, wherein:
   the suspension pin and the seating element are spaced apart and arranged to extend in the transverse direction of the load-receiving structure, and
   that the suspension pin and the seating element have corresponding contours.

4. The laboratory balance of claim 3, wherein a spacing between the hook-shaped portion and the support portion is substantially equal to the spacing between the suspension pin and the seating element.

5. The laboratory balance of claim 1, wherein the hook-shaped portion is arcuate with a contour to engage the suspension pin.

6. The laboratory balance of claim 1, wherein the connecting member is a cross bar that connects the vertical portions of the two sidebars.

7. The laboratory balance of claim 1, wherein the connecting member comprises a grid that connects the horizontal portions of the two sidebars.

8. The laboratory balance of claim 1, wherein the weighing pan further comprises a sample receiver in the form of a plate firmly attached to the grid.

9. The laboratory balance of claim 1, wherein the at least one passage opening comprises two vertical slits in the weighing chamber rear wall, sufficiently sized and spaced apart to allow the vertical portions of the two sidebars to pass through.

10. The laboratory balance of claim 9, the distance between the two vertical slits of the weighing chamber rear wall is substantially equal to the distance between the two sidebars.

11. The laboratory balance of claim 1, wherein the suspension pin is longer than the distance between the two sidebars.

12. A method for installing the weighing pan on the load-receiving structure of the laboratory balance of claim 1, comprising the steps of:

positioning the weighing pan on the weighing chamber floor with the vertical portions of the two sidebars next to and facing towards the two vertical slits of the weighing chamber rear wall;

advancing the vertical portions of the two sidebars into the at least one passage opening of the weighing chamber rear wall;

pushing the weighing pan in the direction towards the weighing chamber rear wall with a sufficiently strong force to cause the guiding portions on the vertical legs of the two sidebars to slide up on the suspension pin of the load-receiving structure; and continuing to push the weighing pan in the direction towards the weighing chamber rear wall until the hook-shaped portions settle into engagement with the suspension pin, and the support portions of the vertical legs of the two sidebars are in solid contact with the seating element, at which point the weighing pan (14) has reached its operating position.

13. A method for uninstalling the weighing pan from the load-receiving structure of the laboratory balance of claim 1, comprising the steps of:

lifting the weighing pan in a substantially vertical upward direction with sufficiently strong force to disengage the hook-shaped portions of the weighing pan from the suspension pin; and allowing the guiding portions to freely slide back over the suspension pin under the force of gravity to the point where the weighing pan is free of the suspension pin and can be taken out of the weighing chamber.

14. The method of claim 12, wherein the cross bar that connects the vertical legs of the two side bars is arranged to stop the further advancement of the weighing pan towards the weighing chamber rear wall before the horizontal portions of the side bars begin to enter the at least one passage opening.

\* \* \* \* \*